(12) United States Patent
Nakazawa et al.

(10) Patent No.: US 7,177,599 B2
(45) Date of Patent: Feb. 13, 2007

(54) LINE QUALITY CHARACTERISTIC EVALUATION SYSTEM

(75) Inventors: Isao Nakazawa, Kawasaki (JP);
Yoshiaki Kobayashi, Tokyo (JP);
Ryoichi Shimada, Tokyo (JP);
Toshikazu Youkai, Tokyo (JP);
Tatsuaki Hamai, Tokyo (JP); Kaoru Murakami, Musashino (JP); Hiroyo Ogawa, Koganei (JP)

(73) Assignees: Fujitsu Limited, Kawasaki (JP);
National Institute of Information and Communications Technology, Tokyo (JP); KDDI Corporation, Tokyo (JP)

( * ) Notice: Subject to any disclaimer, the term of this patent is extended or adjusted under 35 U.S.C. 154(b) by 590 days.

(21) Appl. No.: 10/643,078

(22) Filed: Aug. 19, 2003

(65) Prior Publication Data

US 2004/0179484 A1 Sep. 16, 2004

(30) Foreign Application Priority Data

Feb. 21, 2003 (JP) ............................. 2003-044980

(51) Int. Cl.
*H04B 1/10* (2006.01)
(52) U.S. Cl. .................. 455/63.1; 455/67.13; 370/278

(58) Field of Classification Search ........ 455/423–425, 455/63.1, 63.2, 67.11, 67.13, 67.7, 560, 561; 370/278
See application file for complete search history.

(56) References Cited

U.S. PATENT DOCUMENTS

| | | | | |
|---|---|---|---|---|
| 6,292,519 | B1 * | 9/2001 | Popovic ....................... | 375/346 |
| 6,646,449 | B2 * | 11/2003 | Seppinen et al. ........... | 324/624 |
| 6,885,694 | B1 * | 4/2005 | He et al. ..................... | 375/144 |
| 2005/0032472 | A1 * | 2/2005 | Jiang et al. ................. | 455/13.4 |

\* cited by examiner

*Primary Examiner*—Joseph Feild
*Assistant Examiner*—David Q. Nguyen
(74) *Attorney, Agent, or Firm*—Staas & Halsey LLP

(57) ABSTRACT

A line quality characteristic evaluation system for estimating a line quality characteristic under an interference environment including nonlinear interference for a wireless communication system including at least one interfering wireless line, including a line quality estimating unit estimating the line quality of a wireless communication line under a nonlinear interference wireless line in an area in which wireless communication lines and interfering wireless lines are present together based on nonlinear distortion included by all wireless lines and expressed by an intercept point input level (IIP), a reception equivalent band limitation expressed by attenuation of the intercept point input level (IIP), reception side thermal noise of the wireless communication lines, and leakage power from other interfering wireless lines leaking into the reception equivalent band.

5 Claims, 9 Drawing Sheets

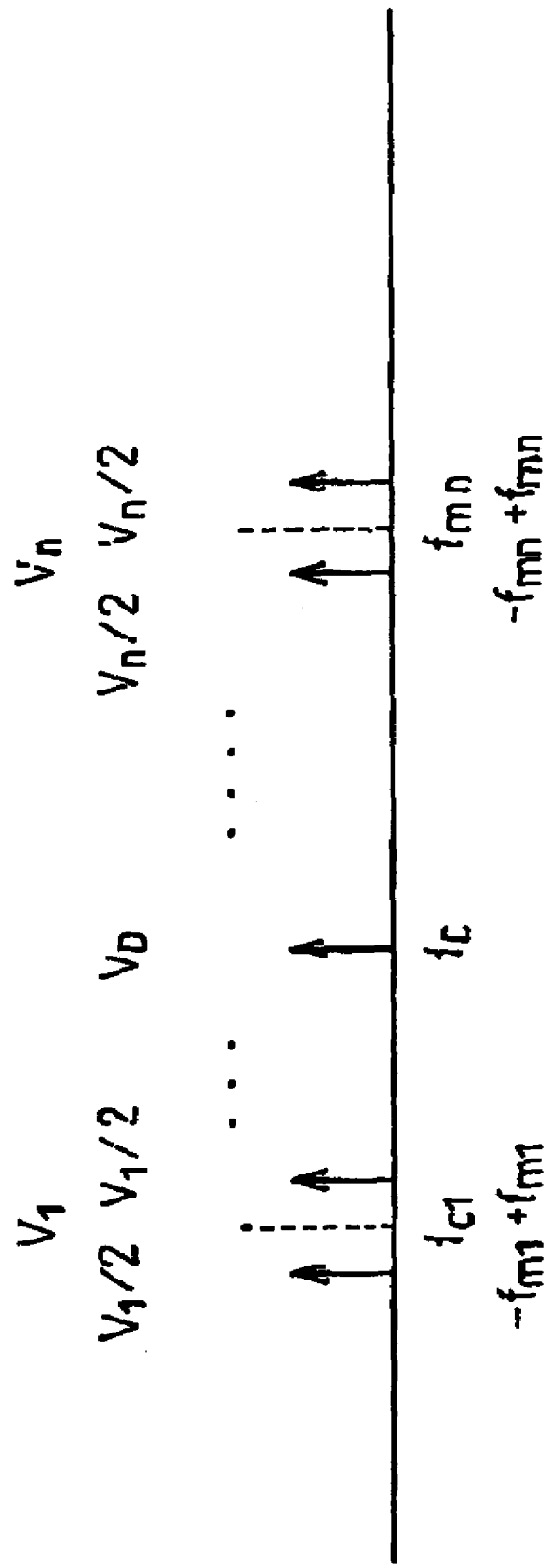

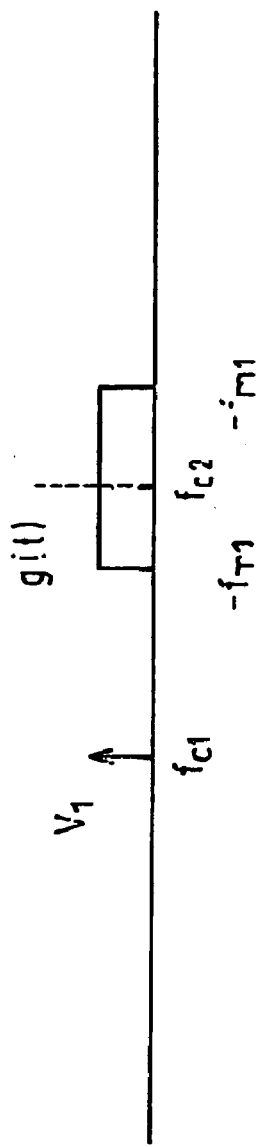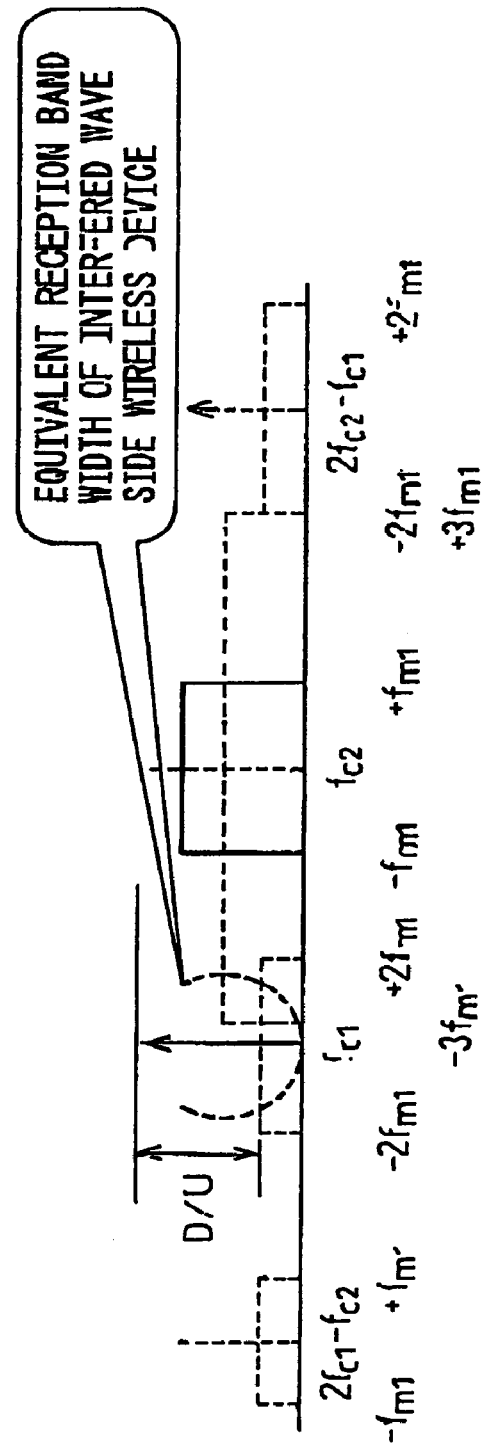

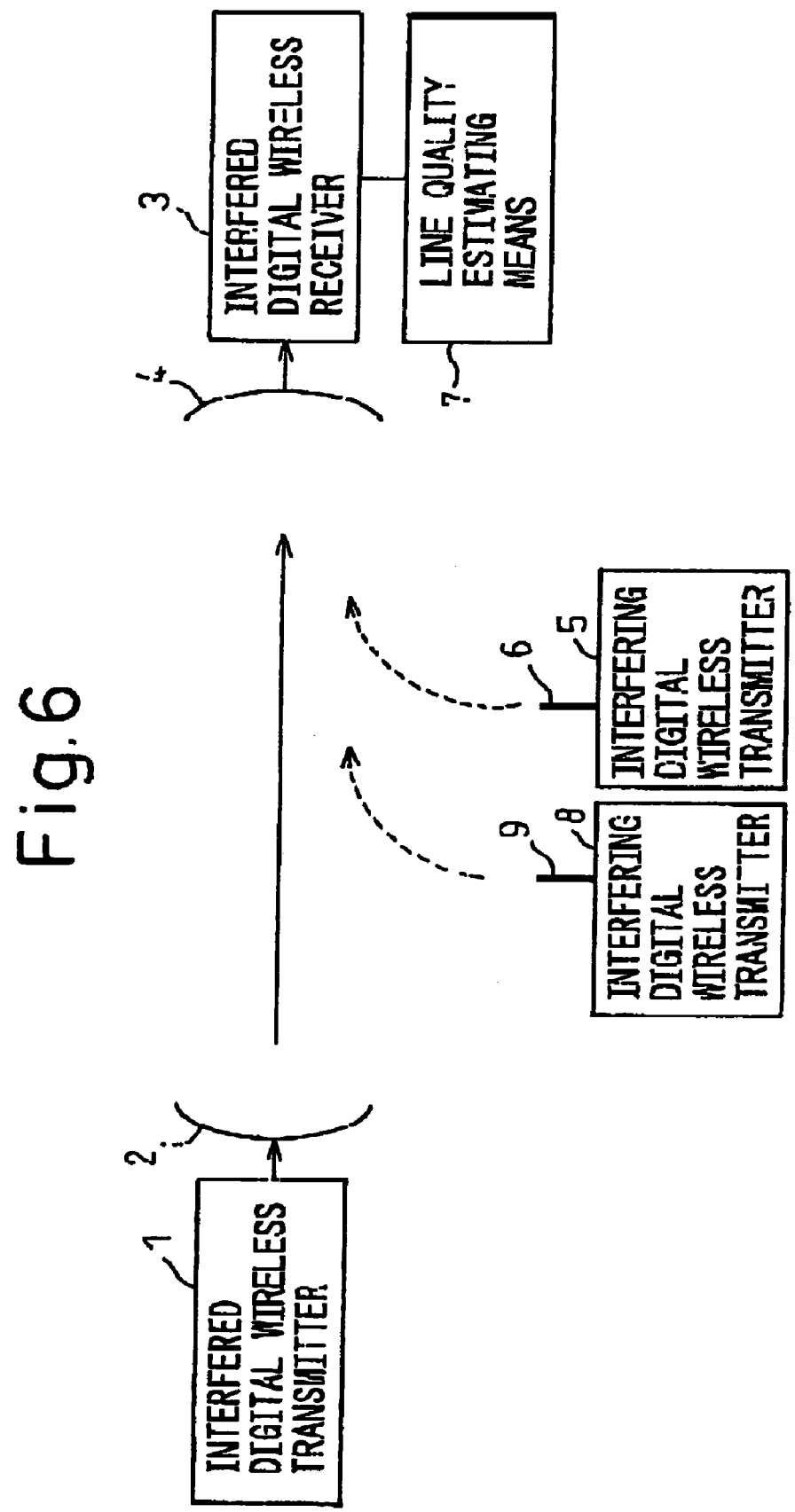

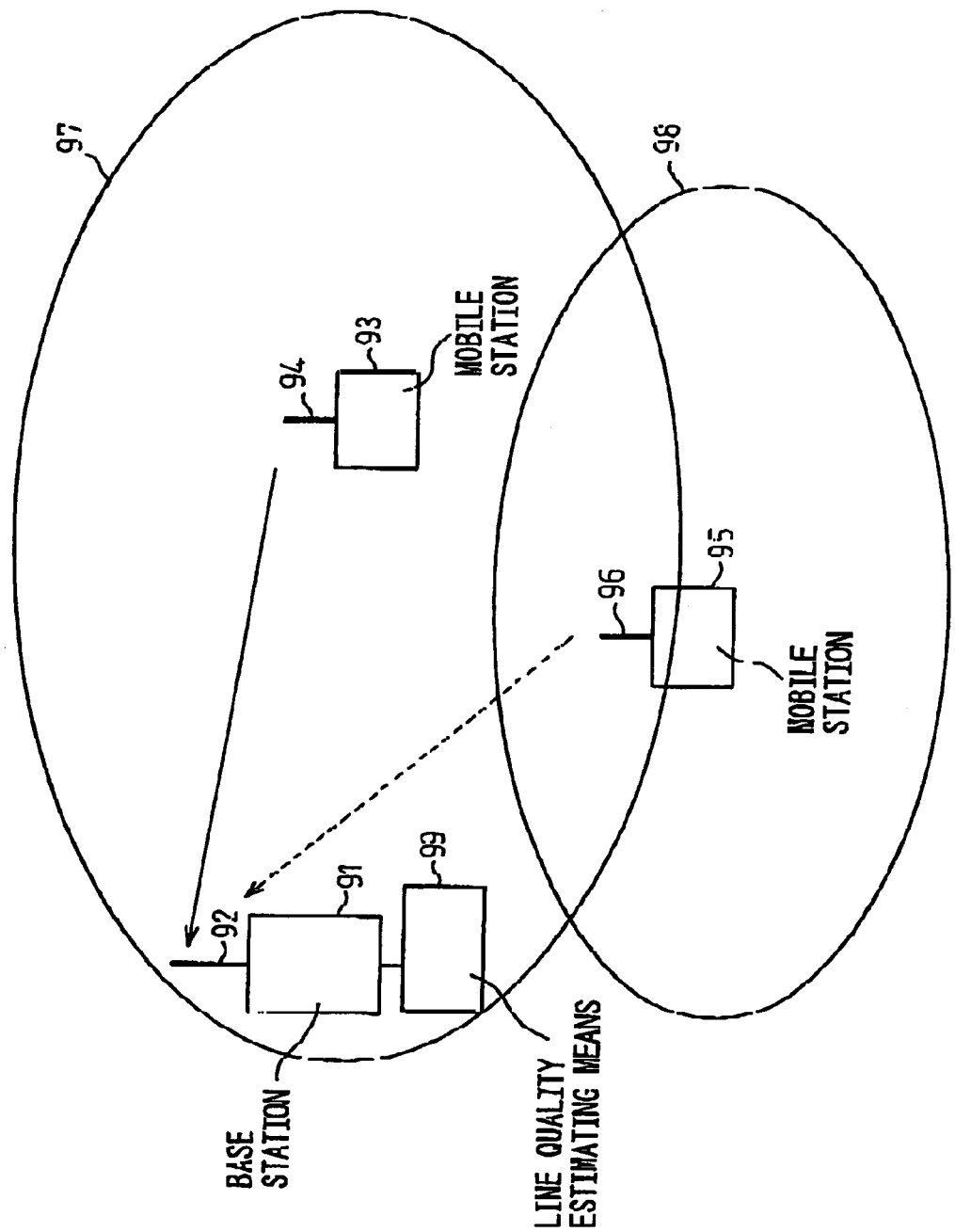

LINE QUALITY CHARACTERISTIC EVALUATION SYSTEM

BACKGROUND OF THE INVENTION

1. Field of the Invention

The present invention relates to a line quality characteristic evaluation system, more particularly relates to a line quality characteristic evaluation system for estimating the line quality of a wireless communication line in an area where a plurality of wireless communication lines are present together based on a receiving line quality characteristic due to nonlinear interference, reception thermal noise power, leakage power from adjacent channels, etc.

2. Description of the Related Art

Wireless communication systems mainly suffer from interference not only between terrestrial mobile wireless systems and terrestrial fixed wireless systems, but also between commercial wireless systems for space and mobile satellite communication systems. These mutual interferences include linear interference due to leakage power from adjacent or next-to-adjacent areas or linear interference due to frequency sharing and nonlinear interference where intermodulation distortion occurs due to high level interference power. In areas where the service areas are broad and many systems coexist, the study of nonlinear interference has been becoming important.

In areas with a coexistence of wireless systems such as conventional mobile wireless communication systems together or a mobile wireless communication system, terrestrial fixed microwave communication system, and mobile satellite communication system, the line quality has been evaluated by the leakage power of the linear parts of interference waves, filtering at the reception side, the modulation/demodulation scheme, etc., but the nonlinear interference has not been sufficiently evaluated.

Further, while the performance relating to nonlinear interference in receiv rs by themselves and individual specifications inside apparatuses of interfered wireless systems have been known, there has never been a means for estimating the above specifications as overall receiver performance in a transmitter and a receiver.

Nonlinear distortion has been analytically verified in the past. In this, using mathematical algorithms and introducing the third-order intercept point input level (IIP3) technique, the spread of an intermodulation product (IM) spectrum by a modulated wave, the occurrence of an interference wave due to IM, and the sensitivity suppression have been studied (for example, dew "Study of Nonlinear Interference Theory Relating to Wide Band Mobile Wireless System and Narrow Band Mobile Wireless System", *Journal of the EIAJ, EIAJ, RCS*2002-140, Aug. 22, 2002, and "Intercept Point and Undesired Responses", *IEEE Transaction on Vehicular Technology*, vol. VT32, no. 1, February 1983).

Summarizing the problems to be solved by the invention, as explained above, in the past, sufficient nonlinear distortion was not taken against nonlinear interference, so there was the problem that it was not possible to analyze the cases of occurrence of nonlinear distortion due to nonlinearity of the receiver and power of the interfering wave, the frequency interval between the desired wave and interference wave, etc., so as to reduce the frequency of occurrence and deterioration of quality in the service area.

SUMMARY OF THE INVENTION

An object of the present invention is to provide a line quality characteristic evaluation system for estimating line quality characteristics including nonlinear interference for a wireless communication system including at least one wireless line.

To attain the above object, according to the present invention, there is provided a line quality characteristic evaluation system for a wireless communication line provided with a line quality estimating unit estimating a line quality of a wireless communication line under nonlinear interference wireless lines in an area in which wireless lines for wireless communication by digital signals sharing space and other wireless lines interfering with those wireless lines are present together based on nonlinear distortion influenced by all wireless lines in the area and expressed by an intercept point input level (IIP), a reception equivalent band limitation expressed by attenuation of the intercept point input level (IIP), reception side thermal noise of the wireless communication lines, and leakage power from other interfering wireless lines leaking into the reception equivalent band.

Due to this, even in an area where wireless lines wirelessly communicating while sharing space and other wireless lines interfering with them are present together, it becomes possible to estimate the line quality of the wireless communication system under nonlinear interference and thereby becomes possible to establish measures for improving the line quality.

Preferably, there are a plurality of other wireless lines and the line quality estimating unit further estimates the line quality of a wireless communication line based on probabilities of existence or an interfering plurality of wireless lines at any positions in the area.

Due to this, it becomes possible to estimate the line quality of a wireless communication system under nonlinear interference based on factors influenced by all of the lines in the area even when there are a plurality of interfering wireless lines, so it is possible to flexibly estimate the line quality. Further, it becomes possible to estimate the line quality of a wireless communication system under nonlinear interference even when the interfering wireless equipment move.

More preferably, the line quality estimating unit provides base stations and mobile stations for communicating by digital signals in the area and, at a downstream mobile wireless line from a base station to a mobile station, estimates a wireless line quality of a range of area under nonlinear interference by a plurality of interference waves for a planar distribution of mobile stations based on a mobile station reception level due to mobile stations distributed in the area and a multiplexer channel of downstream lines, an interference level received by the mobile station from a wireless line in the area or nearby, and a prescribed value in the area.

Due to this, it become possible to estimate the line quality of a wireless communication system under nonlinear interference even if a plurality of mobile stations are moving in an area.

Still more preferably, the line quality estimating unit estimates a channel capacity in an upstream mobile wireless line from a mobile station to a base station in a range of area under nonlinear interference based on a reception level of a signal by the base station by a multiplexer channel from a plurality of mobile stations distributed in the area, an interference level received by the base station from a wireless line in the area or nearby, an amount of interference in a same system from a plurality of mobile stations distributed in the area, and the number of the plurality of mobile stations distributed planarly.

Due to this, it is possible to estimate the channel capacity in a range of area under nonlinear interference.

BRIEF DESCRIPTION OF THE DRAWINGS

These and other objects and features of the present invention will become clearer from the following description of the preferred embodiments given with reference to the attached drawings, wherein:

FIG. 4 is a view of an example of a spectrum of an input signal (modulated wave signal) input to an interfered digital wireless receiver;

FIG. 5A is a view of an example of a spectrum of an input signal (modulated wave signal) input to a receiver, while FIG. 5B is a view of a spectrum of an output signal for explaining an increase in adjacent leakage power due to an interference wave intermodulation product output from a receiver in response to an input signal shown in FIG. 5A;

FIG. 6 is a block diagram of the configuration of a line quality characteristic evaluation system according to a second embodiment of the present invention;

FIG. 9 is a block diagram of the configuration of a line quality characteristic evaluation system according to a fifth embodiment of the present invention.

DESCRIPTION OF THE PREFERRED EMBODIMENTS

Figure 1:
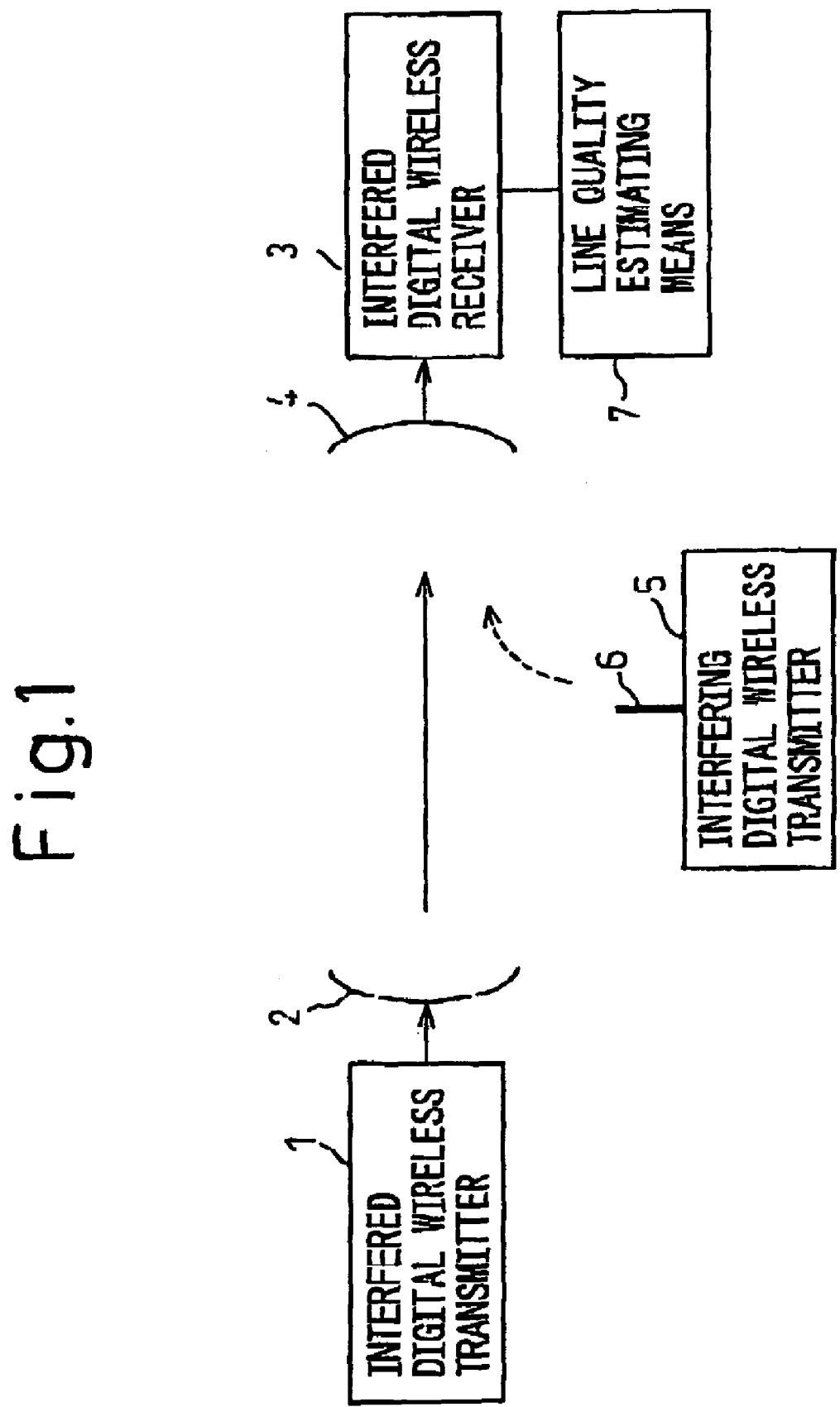
FIG. 1 is a block diagram of the configuration of a line quality characteristic evaluation system according to a first embodiment of the present invention.

Preferred embodiments of the present invention will be described in detail below while referring to the attached figures. Note that in the following explanation, the same reference numerals indicate the same elements.

First Embodiment

FIG. 1 is a block diagram of the configuration of a line quality characteristic evaluation system according to a first embodiment of the present invention. In the figure, 1 is an interferod digital wireless transmitter, 2 is an antenna of an interfered digital wireless transmitter, 3 is an interfered digital wireless receiver, 4 is an antenna of an interfered digital wireless receiver, 5 is an interfering wireless transmitter, 6 in an antenna of an interfering digital wireless transmitter, and 7 is a line quality estimating means provided according to the present invention.

In the figure, the solid lines show the route of the desired wave, while the broken line shows the route of the interference wave. In FIG. 1, for simplification of the illustration, only one interfering digital wireless transmitter is shown, but in general there are a plurality of interfering digital wireless transmitters.

The line quality estimating means 7 may be realized by any control device such as a microprocessor.

In the present embodiment, the line quality estimating means 7 estimates a line quality of a wireless communication link under nonlinear interference wireless link in an area in which wireless link for wireless communication by digital signals sharing space (between antenna 2 and antenna 4) and other wireless link interfering with the wireless link (between antenna 6 and antenna 4) are present together based on nonlinear distortion influenced by all wireless link in the area and expressed by an intercept point input level (IIP), a reception equivalent band limitation expressed by attenuation of the intercept point input level (IIP), reception side thermal noise of the wireless communication link, and leakage power from other interfering wireless link leaking into the reception equivalent band.

As one example of a line quality characteristic, there is the bit error rate, but the line quality characteristic is not limited to this. The invention may also be applied to a frame error rate, block error rate, packet error rate, etc.

Figure 2:
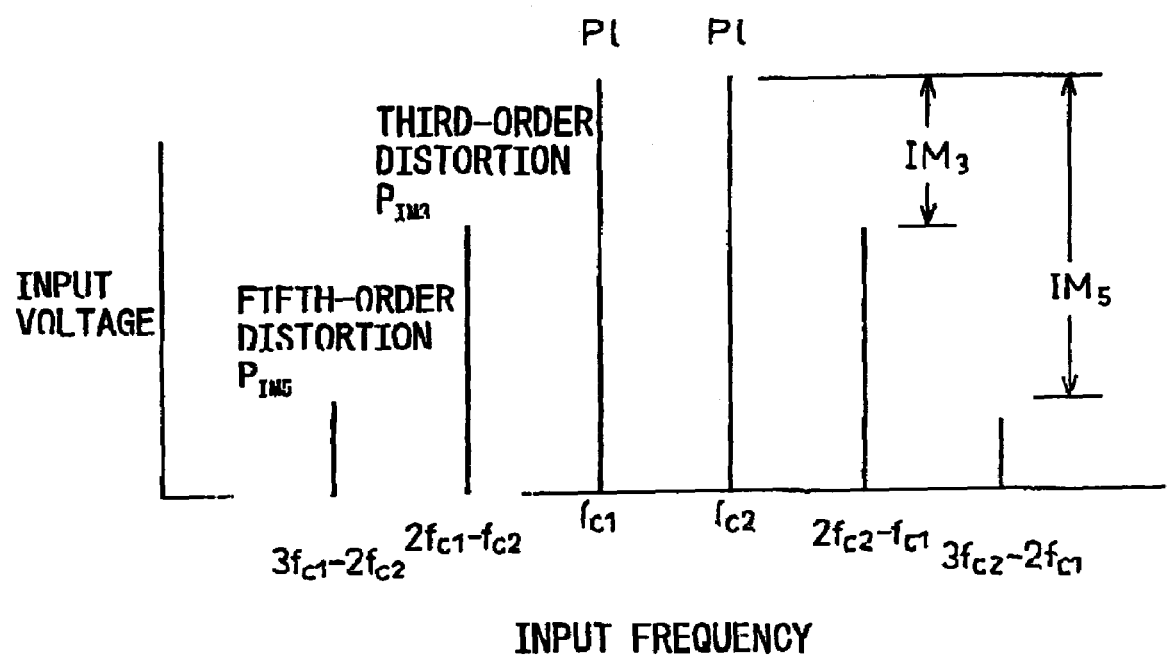
FIG. 2 is a graph for explaining the levels of a main signal, a third-order distortion signal, and a fifth-order distortion signal in the case of receiving as input at a reception side two signals of the same level with close frequencies.

FIG. 2 is a graph for explaining the levels of a main signal, a third-order distortion signal, and a fifth-order distortion signal in the case of receiving as input at a reception side two signals of the same level with close frequencies. In FIG. 2, when the two main signals $P_t$ of the close frequencies $f_1$ and $f_2$ are input, third-order distortion of a level $P_{nG}$ is caused by frequencies of $2f_2-f_1$ and $2f_1-f_2$ and fifth order distortion of a level $P_{TM5}$ is caused by frequencies of $3f_2-2f_1$ and $3f_1-2f_2$.

Figure 3:
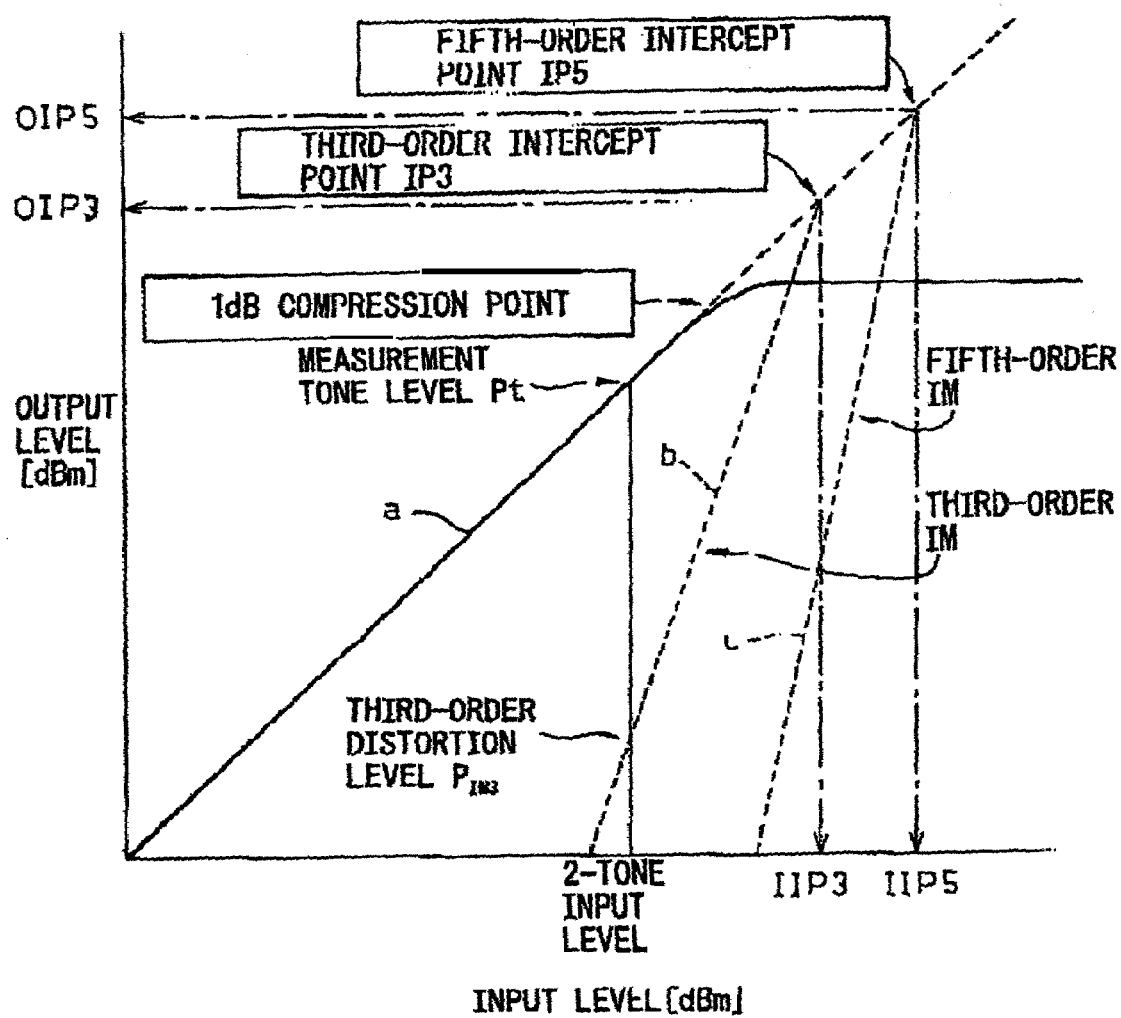
FIG. 3 is a graph for estimating an intercept point from a relationship of the input level and output level at a reception side.

FIG. 3 is a graph for estimating an intercept point from a relationship of the input level and output level at a reception side. In FIG. 3, the line "a," shows the relationship between the input levels and output levels of the two main signals, the line "b" shows the relationship between of the input level of the third-order distortion IM (intermodulation) with respect to the input level of the main signal, and the line "c" shows the relationship of the output level of the fifth-order distortion IM (intermodulation) with respect to the input level of the main signal. If the levels of the two main signals are simultaneously raised, the difference $IM_3$ (see FIG. 3) between the level $P_t$ of the main signal and the level $P_{nG}$ of the third-order distortion signal will gradually become smaller. The output of the reception side in an actual wireless communication system becomes saturated as shown by the solid line in the figure, but if assuming that the output level increases linearly in proportion to the input level, the line "b" showing the third-order distortion will intersect with the part shown by the broken line of the main signal. The output level at the intersection point is called the "third-order intercept point output level", while the input level is called the "third-order intercept point input level". The present invention estimates this third-order intercept output level or third-order intercept input level in the case of the presence of a plurality of interference waves by the line quality estimating means 7 and estimates the line quality of a wireless communication link under nonlinear interference wireless link based on the nonlinear distortion expressed by the estimated third-order intercept output level or third-order intercept input level, the reception equivalent band limitation expressed by the attenuation of the third-order intercept input, the reception side equivalent thermal noise of the wireless communication line, and the leakage power in the reception equivalent band width leaking from another interfering wireless line.

This estimating means will be explained below.

FIG. 4 is a view of an example of a spectrum of an input signal (modulated wave signal and interference wave signal) input to an interfered digital wireless receiver.

(1) Input Signal and Output Signal Spectrum

If expressing the baseband of a mobile wireless equipment of an interfering side by a single wave modulation signal and making the carrier of the mobile wireless equipment of the interfered side a nonmodulated wave, the signal input to the amplifier (interfered digital wireless receiver 3) is expressed by equation (1) (hereinafter referred to as "single wave modulation signal").

$$x(t) = V_D \cdot \cos(2\pi f_D t) + \sum_{n=1}^{n} V_n \times \cos(2\pi f_{cn} t) \times \cos(2\pi f_{mn} t) \quad (1)$$

where, $f_D$: carrier frequency of mobile wireless equipment of interfered side $V_D$: carrier voltage of mobile wireless equipment of interfered side $f_{cn}$: n-th carrier frequency of mobile wireless equipment of interfering side $V_n$: n-th modulation signal voltage of baseband of mobile wireless equipment of interfering side $f_{mn}$: n-th modulation frequency of baseband of mobile wireless equipment of interfering side If making the input signal of the amplifier x(t) and making the output signal y(t), the nonlinear characteristic can be expressed by power series expansion as follows:

$$y(t) = a_1 x(t) + a_2 x(t)^2 - a_3 x(t)^3 + \quad (2)$$

Here, $a_1, a_2, a_3 \ldots$ are nonlinear coefficients of power series expansion, and the sign of the third-order coefficient $a_3$ is made a minus sign from the saturation characteristic of the amplifier. If entering equation (1) into equation (2), the output signal y(t) becomes as shown in equation (3):

$$y(t) = \quad (3)$$

($f_D$ component) $+ a_1 \cdot V_D \cdot \cos 2\pi f_D t -$ $a_3 \cdot V_D^3 \cdot 3/4 \cdot \cos 2\pi f_D t +$ $\sum_{n=1}^{n} \{-a_3 \cdot V_D \cdot V_n^2 \cdot 3/4 \cdot \cos 2\pi f_{mn} t\}$ (In double modulated wave) $\sum_{n=1}^{n} \{-a_3 \cdot V_D \cdot V_n^2 \cdot 3/4 \cdot \cos 2 \cdot 2\pi f_{mn} t \cdot \cos 2\pi f_{cn} t\}$ (1) Estimation of Nonliner Interference Characteristic When $f_{cn} - f_D > 3 f_{mn}$ by the frequency array shown in FIG. 4, the nonlinear interference characteristic of a narrow band mobile wireless equipment expressed by the nonmodulated wave (frequency $f_{c1}$) is expressed by the power ratio ($C/1_0$) of the sensitivity suppression of the frequency $f_{c1}$ and a double component (2 $f_{mn}$) of the modulated signal of the mobile wireless equipment relating to the frequency $f_{c1}$.

The sensitivity suppression ($\eta$) due to nonlinear interference, if expressed in dB, becomes as follows:

If powers of the frequencies $f_{c1}$ and $f_{cn}$ normalized by the input third-order intercept point IIP3 are $I_{iO}$ and $I_{in}$, they are expressed by:

$$\eta = 10 \times \log \left\{ 1 - I_{lio} - \sum_{n=1}^{n} 2 \cdot I_{in} \cdot k_n \right\}^2 \quad (4)$$

Here, $k_n$ indicates the attenuation of the interference wave due to reception equivalent band limitation by an offset frequency with the desired wave of the n-th interference wave.

In this way, when there are a plurality of mobile wireless equipment at the interfering side, the sensitivity suppression which all of these have on the interfered side can be estimated.

Further, regarding the power ratio ($C/I_3$), from the power ratio of the $f_D$ component of equation (3) and the $f_D$ double modulated wave component by the intermodulation product, $C/I_3$ (dB) becomes:

$$C/I_3 = 10 \times \log \left\{ \left( 1 - I_{iI} - \sum_{n=1}^{n} 2 \cdot I_{in} \cdot k_n \right)^2 \Big/ \sum_{n=1}^{n} 2 \cdot (2 \cdot I_{in} \cdot k_n)^2 \right\} \quad (5)$$

if using $I_D$ and $I_{in}$ normalized by IIP3.

Here, $k_n$ expresses the attenuation of the interference wave by reception equivalent band limitation by the offset frequency with the desired wave of the n-th interference wave.

In this way, when there are a plurality of mobile wireless equipment at an interfering side, it is possible to estimate the effect which they all have on the power ratio of the interfered side.

(2) Estimation of Error Rate Characteristic a) Delay Detection Type Simplified Error Rate Characteristic $$ber(I_{i0}, I_{i1}, \ldots I_{in}) - \tfrac{1}{2} \times \exp(-\rho/2) \quad (6)$$

Here, $I_{iD}$: desired wave signal level normalized by IIP3

$I_{i1}$: interference wave signal level normalized by IIP3.

If the signal to noise power ratio is $\rho$, $$\rho - A^2/2/\sigma^2 \quad (7)$$

where, $\sigma^2$: sum of noise power and interference power

If the reception power of the frequency $f_{c1}$ is C, the sensitivity suppression is $\eta$, and the fixed deterioration is $\delta$, $\rho$ becomes the following equation:

$$\rho = 1/\{1/(\eta \cdot \delta \cdot C/P_N) |1/(\eta \cdot \delta C/I_{ACP}) |1/(\eta \cdot \delta \cdot C/I_3)\} \quad (8)$$

where, $P_n$: reception thermal noise power of interfered wireless communication $I_{ACP}$: total power of leakage power affecting interfered wireless communication as calculated from interference power and reduction factor ($IRF_n$)

$$C/I_{ACP} - 1 \Big/ \sum_{n=1}^{n} \{1/C/I_{ACPn}\} \quad (9)$$

Here, $C/I_{ACPn}$ is the leakage power affecting interfered wireless communication as calculated from the n-th interference wave power and n-th reduction factor ($IRF_n$).

C/I₃ is the power ratio (truth value) of the double modulation component of the modulated wave component of the $f_D$ component and $f_{cn}$ component as calculated from equation (4).

η is the sensitivity suppression (truth value) as calculated from equation (3) (η).

b) Delay Detection Type Error Rate Characteristic $$ber(I_{i0}, I_{i1}, \ldots, I_{in}) = Q(a,b) - \frac{1}{2} \times \exp\left[-\frac{a^2+b^2}{2}\right] I_0(ab) \quad (10)$$

$$\begin{cases} a = \sqrt{2\gamma_{Eb/N0}(1-1/\sqrt{2})} \\ b = \sqrt{2\gamma_{Eb/N0}(1+1/\sqrt{2})} \end{cases}$$

where,
Q: Marcum Q-function
$T_0$: 0-th modification Bessel function of the first kind $$\gamma = 1/\{1/(\eta \cdot \delta \cdot E_b/N_0) + 1/(\eta \cdot \delta \cdot Bn \cdot E_b/I_{ACP}) + 1/(\eta \cdot \delta \cdot Bn \cdot E_b/I_3)\} \quad (11)$$

where,
$E_b$: energy per bit
$N_o$: noise power density
$I_{ACP}$: leakage power affecting interfered wireless communication as calculated from interference wave power and reduction factor (IRFn)

$$C/I_{ACP} = 1 \bigg/ \sum_{n=1}^{n}\{1/C/I_{ACPn}\} \quad (12)$$

Here, $C/I_{ACPn}$ is the leakage power affecting interfered wireless communication as calculated from the n-th interference wave power and n-th reduction factor (IRFn).

$$Bn \cdot E_b / I_3 = \frac{C}{I_o} \cdot \frac{Bn}{k} \cdot Bn \cdot T \quad (13)$$

C/I₃ is the power ratio (truth value) of the intermodulation wave component r lating to the $f_{c1}$ component and $f_{n1}$ component as calculated from equation (5) or equation (11).

Here,
Bn: reception equivalent noise band width of interfered wireless communication
T: time length with respect to symbol period
k: amount of information (bits) per symbol
η: sensitivity suppression (truth value) as calculated from equation (3)

c) QPSK Absolute Synchronous Detection Error Rate Characteristic $$ber(I_{i0}, I_{i1}, \ldots, I_{in}) = \frac{1}{2} \times erfc\sqrt{\gamma} \quad (14)$$

where, $$\gamma = 1/\{1/(\eta \cdot \delta \cdot E_b/N_0) + 1/(\eta \cdot \delta \cdot Bn \cdot E_b/I_{ACP}) \cdot 1/(\eta \cdot \delta \cdot Bn \cdot E_b/I_5)\}$$

Here,
$E_b$: energy per bit
$N_0$: noise power density
$I_{ACP}$: leakage power affecting interfered wireless communication as calculated from interference wave power and reduction factor (IRFn)

$$Bn \cdot E_b / I_3 = \frac{C}{I_o} \cdot \frac{Bn}{k} \cdot Bn \cdot T \quad (16)$$

C/I₀ is the power ratio (truth value) of the intermodulation wave component relating to the $f_{c1}$ component and $f_{c1}$ component as calculated from equation (5) or equation (11).

Here,
$B_n$: reception equivalent noise band width of interfered wireless communication
T: time length with respect to symbol period
k: amount of information (bits) per symbol
η: sensitivity suppression (truth value) as calculated from equation (3) (η)

If the reception power of the frequency $f_{c1}$ is C and the soncitivity suppression is η, ρ becomes the following equation:

$$\rho = 1/\{1/(\eta \cdot \delta \cdot C/P_n) + 1/(\eta \cdot \delta \cdot C/I_{ACP}) + 1/(\eta \cdot \delta \cdot C/I_3)\} \quad (17)$$

where,
$P_n$: reception thermal noise power of interfered wireless communication
$I_{ACP}$: total power of leakage power affecting interfered wireless communication AS calculated from interference power and reduction factor (IRFn)

$$C/I_{ACP} = 1 \bigg/ \sum_{n=1}^{n}\{1/C/I_{ACPn}\} \quad (18)$$

Here, $C/I_{ACPn}$ is the leakage power affecting interfered wireless communication as calculated from the n-th interference wave power and n-th reduction factor (IRFn).

C/T₃ is the power ratio (truth value) of the double modulation component of the modulated wave component of the $f_D$ component and $f_{cn}$ component as calculated from equation (4).

η is the sensitivity suppression (truth value) as calculated from equation (3).

$$Bn \cdot E_b / I_3 = \frac{C}{I_3} \cdot \frac{Bn}{k} \cdot Bn \cdot I \quad (18)$$

C/I₃ is the power ratio (truth value) of the intermodulation wave component relating to the $f_D$ component and $f_D$ as calculated from (C/I₂) of equation (5) or equation (11).

Here,
$B_n$: reception equivalent noise band width of interfered wireless communication
T: time length with respect to symbol period
k: amount of information (bits) per symbol
η: sensitivity suppression (truth value) as calculated from equation (3) or equation (9)

d) QPSK Differential Synchronous Detection Error Rate Characteristic

This is found as about double the QPSK absolute synchronous detection error rate characteristic.

$$ber(I_{i0}, I_{i1}, \ldots, I_{in}) = erfc\sqrt{\gamma} \quad (20)$$

Next, the increase in the adjacent leakage power due to the interference wave intermodulation product when the frequency interval of the interference wave and interfered wave is narrow in absolute terms will be explained.

FIG. 5A is a view of an example of a spectrum of an input signal of an interfered digital wireless receiver 3, while FIG. 5B is a view of a spectrum of an output signal output from the receiver 3 in accordance with this. As shown by the broken lines of FIG. 5B, when three times the modulation frequency of the modulated wave at the nearby interference side close to the interfered wave is broader than the frequency interval of the interference wave and interfered wave, the interference wave component causes the adjacent leakage power to increase due to the third-order distortion of the wireless receiver of the interfered side.

If the ratio of the adjacent leakage power increasing by this intermodulation product with the power of the wireless band of the nearby interference wave is designated as $IRF_3$, it may be expressed as follows:

$$TRF_3 = -10 \times \log[I^2_{in}] + B \text{(dB)} \tag{21}$$

Here, B is a constant determined by the frequency spectrum distribution of the frequency $f_{c2}$, the maximum modulation frequency, the equivalent reception band width (BW) of the frequency $f_{c1}$, and the frequency interval between the frequency $f_{c1}$ and the frequency $f_{c2}$.

The component $(y_{fc2})$ resulting from third-order distortion of the frequency $f_{c2}$ component is $$y_{fc2} = -a_3 \times g(t)^3 \tag{22}$$

Here, $$g(t) = \Sigma V_2(k) \times \cos(k \cdot 2\pi f_n \cdot t \cdot \Delta\theta_k)$$

$[1 \leq k \leq n]$

Note that, $V_2(k)$: k-th modulation signal voltage of baseband of mobile wireless equipment of interfering side $\Delta f_m$: modulation frequency interval of baseband of interfering side $\Delta\theta_k$: phase of modulation frequency of mobile wireless of interfering side $Fm = n \times \Delta f_m$: maximum modulation frequency of mobile wireless equipment of interfering side By expanding equation (22), the frequency $f_{c2}$ component is expressed as follows:

$$y_{fc2} = -a_3 \cdot 6 \cdot (3)^{1/2} \cdot \Sigma v_2(k) \cdot \Sigma v_2(l) \cdot \Sigma v_2(\omega) \cdot \cos(m \cdot 2\pi\Delta f_n \cdot t + \Delta\theta m \times \cos(2\pi f_{c2} t + \theta(t))) \; [1 \leq k \leq n-2, k+1 \leq l \leq n-1, l+1 \leq m \leq n] \tag{23}$$

where, $V_2(k)$: k-th modulation signal voltage of baseband of mobile wireless equipment at interfering side $\Delta f_m$: modulation frequency interval of baseband at interfering side $\Delta\theta_k$: phase of k th modulation frequency of mobile wireless equipment of interfering side $\Delta\theta_1$: phase of 1st modulation frequency of mobile wireless equipment of interfering side $\Delta\theta_m$: phase of m-th modulation frequency of mobile wireless equipment of interfering side $Fm = n \times \Delta f_m$: maximum modulation frequency of mobile wireless of interfering side $f_{c2}$: carrier frequency of mobile wireless equipment of interfering side $\theta(t)$: phase of carrier frequency of mobile wireless equipment of interfering side

[v]: range of product-sum

Expressing equation (18) by the A+B+C type, A+B−C type, A−B+C type, and A−B−C type by combination of the modulation frequencies, expressing the composite frequency of the three modulated waves of the k, l, and m components by L, expressing the composite frequency of the two modulated waves of the l and m components by S, and converting the modulation frequencies to L, S, and m in equation (23), the power with respect to $f_I = L \cdot \Delta f_m$ is expressed by the following:

$$p_{f2}(f_L) = \tag{24}$$

| | |
|---|---|
| A + D + C TYPE | |
| $+3 \times (-a_3 \cdot 3/4 \cdot 2R)^2 \cdot 2/4 \cdot (Pin/Fm)^3 \cdot 1/12 \cdot f_L^2 -$ $Fm \leq f_L < 0 \mid 0 < f_L \leq Fm$ | −1 |
| $+3 \times (-a_3 \cdot 3/4 \cdot 2R)^2 \cdot 2/4 \cdot (Pin/Fm)^3 \cdot 1/6 \cdot 1/8 \cdot (3Fm - \mid f_L \mid)^2$ $2Fm \leq f_L < -Fm \mid Fm < f_L \leq 2Fm$ | −2 |
| $+3 \times (-a_3 \cdot 6/8 \cdot 2R)^2 \cdot 2/4 \cdot (Pin/Fm)^3 \cdot 1/16 \cdot (f_L - Fm) \cdot$ $(7Fm \; 3f_L) - 2Fm < f_L < -Fm \mid Fm < f_L \leq 2Fm$ | −3 |
| $+3 \times (-a_3 \cdot 6/8 \cdot 2R)^2 \cdot 2/4 \cdot (Pin/Fm)^3 \cdot 1/3 \cdot 1/16 \cdot$ $(3Fm - f_L)^2 - 3Fm \leq f_L < -2Fm \mid 2Fm < f_L \leq 3Fm$ | −4 |
| $+3 \times (-a_3 \cdot 6/8 \cdot 2R)^2 \cdot 2/4 \cdot (Pin/Fm)^3 \cdot 1/16 \cdot (3Fm - f_L)^2 -$ $3Fm \leq f_L < -2Fm \mid 2Fm < f_L < 3Fm$ | 5 |
| A + B − C TYPE | |
| $+3 \times (-a_3 \cdot 6/8 \cdot 2R)^2 \cdot 2/4 \cdot (Pin/Fm)^3 \cdot 1/4(Fm - \mid f_L \mid)^3 -$ $Fm \leq f_L < 0 \mid 0 < f_L \leq Fm$ | −6 |
| $+3 \times (-a_3 \cdot 6/8 \cdot 2R)^2$ $f_L = 0$ | −7 |
| $+3 \times (-a_3 \cdot 6/8 \cdot 2R)^2 \cdot 2/4 \cdot (Pin/Fm)^3 \cdot 1/4 \cdot (Fm - \mid f_L \mid)^2 -$ $Fm \leq f_L < 0 \mid 0 < f_L \leq Fm$ | −8 |
| A − B + C TYPE | |
| $+3 \times (-a_3 \cdot 6/8 \cdot 2R)^2 \cdot 2/4 \cdot (Pin/Fm)^3 \cdot (Fm - \mid f_L \mid) \cdot \mid f_L \mid -$ $Fm \leq f_L < 0 \mid 0 < f_L \leq Fm$ | −9 |
| A − B − C TYPE | |
| $+3 \times (-a_3 \cdot 6/8 \cdot 2R)^2 \cdot 2/4 \cdot (Pin/Fm)^3 \cdot 1/4 \cdot (2Fm - \mid f_L \mid)^2 -$ $2Fm \leq f_L \leq -Fm \mid (Fm) \leq f_L \leq (2Fm)$ | −10 |
| $+(-a_3 \cdot 6/8 \cdot 2R)^2 \cdot 2/4 \cdot (Pin/Fm)^3 \cdot 1/4 \cdot f_L^3 -$ $Fm < f_L \leq 0 \mid 0 < f_L < Fm$ | −11 |

Here, "|" expression "or" of the left side condition and right side condition.

Applying $a_3/a_1 = 1/(3/2 \cdot IIP3 \cdot R)$ and making the reception passband of the frequency $f_{c1}$ BW<<Fm, it integrating the power $(P_{in})$ in the range of the power $r_{fc2}(f_L)$ to $f_{c1} - BW/2 \leq f_m \leq 4_{n1} + BW/2$ by equation (24) and dividing the result by the total power of the wireless band of the frequency $f_{c2}$ component to find $IRF_2$, the following is obtained:

$$IRF_3 = 10 \times \log(Iin^2) + 10 \times \log \tag{25}$$

| | |
|---|---|
| $+1/4 \times [f_L^2/Fm^2 \mid (DW/2)^2/Fm^2] \cdot (BW/2/Fm)$ $0 \leq f_L \leq Fm - BW/2$ | −1 |
| $+1/16 \times (BW/2/Fm) \cdot \{(f_L/Fm - 3)^2 + 1/3 \cdot (BW/2)^2/Fm^2\}$ $Fm + BW/2 \leq f_L \leq 2Fm$ | −2 |
| $+3/16 \times (BW/2/Fm) \cdot \{(7 - 3f_L/Fm) \cdot (f_L/Fm - 1) -$ $(BW/2)^2/Fm^2\} \; Fm + BW/2 \leq f_L \leq 2Fm - BW/2$ | −3 |
| $+1/16 \times (BW/2/Fm) \cdot \{(3 - f_L/Fm)^2 + 1/3 \cdot (BW/2)^2/Fm^2\}$ $2Fm + BW/2 \leq f_L \leq 3Fm - BW/2$ | −4 |
| $+3/16 \times (BW/2/Fm) \quad \{(3 - f_L/Fm)^2 + 1/3 \cdot (BW/2)^2/Fm^2\}$ $2Fm + BW/2 \leq f_L \leq 3Fm - BW/2$ | −5 |
| $+1/24 \times [3 - (f_L/Fm - BW/2/Fm)^3 + (f_L/Fm + BW/2/Fm)$ $Fm \; BW/2 < f_L < Fm + BW/2 \cdot \{ 2(f_L/Fm + BW/2/Fm)^2 +$ $9(f_L/Fm + BW/2/Fm) - 9\}]$ | −6 |
| $+3/32 \times [(f_L/Fm - BW/2/Fm) \cdot \{(f_L/Fm - BW/2/Fm)^2 -$ $5(f_L/Fm - BW/2/Fm) + 7\} 2Fm - BW/2 < f_L < 2Fm + BW/2 +$ $(f_L/Fm + BW/2/Fm) \cdot \{1/3(f_L/Fm + BW/2/Fm)^2 - 3 \cdot (f_L/Fm +$ $BW/2/Fm) + 9\} - 32/3]$ | −7 |
| $+1/8 \times [9 - (f_L/Fm - BW/2/Fm) \cdot \{9 - 3(f_L/Fm - BW/2/Fm) +$ $1/3(f_L/Fm - BW/2/Fm)^2\}]$ $3Fm - BW/2 < f_L \leq 3Fm$ | −8 |
| $+3/2 \times (BW/2/Fm) \cdot [(1 - f_L/Fm)^2 + (BW/2/Fm)^2/3]$ $BW/2 < f_L \leq Fm - BW/2$ | −9 |
| $+3/2 \times [1/3 \cdot (BW/2/Fm) \cdot \{3/Fm + (BW/2/Fm)^2 -$ $3(BW/2/Fm)\} + \{(BW/2/Fm) - 1\} \cdot f_L^2/Fm/Fm] \; 0 \leq f_L < BW/2$ | −10 |

-continued

| | |
|---|---|
| $+3/4 \times [-\{f_L/Fm - (BW/2/Fm)\} + \{f_L/Fm - (BW/2/Fm)\}^2 + 1/3 - (f_L/Fm - BW/2/Fm)^3/3]$ $Fm - BW/2 \leq f_L < Fm + BW/2$ | −11 |
| $+3 \times [f_1/Fm(BW/2/Fm) - (f_L/Fm)^3 (BW/2/Fm) - 1/3(BW/2/Fm)^3]$ $BW/2 < f_L \leq Fm_L - BW/2$ | −12 |
| $+3/2 \times \{(BW/2/Fm)^2 + (f_L/Fm)^2 - 2/3 (BW/2/Fm)^3 - 2(BW/2/Fm)(f_L/Fm)^2\}\ 0 \leq f_L < BW/2$ | −13 |
| $+3/2 \times \{1/6 - 1/2(f_L/Fm - BW/2/Fm)^2 + 1/3(f_L/Fm - BW/2/Fm)^3\}$ $Fm - BW/2 < f_L \leq Fm + BW/2$ | −14 |
| $+3 \times \{1/3(BW/2/Fm)^3 + (f_L/Fm)^2 (BW/2/Fm)\}$ $0 \leq f_L \leq Fm - BW/2$ | −15 |
| $+3/4 \times \{(2 - f_L/Fm)^2 (BW/2/Fm) + 1/3 (BW/2/Fm)^3\}$ $Fm + BW/2 < f_L \leq 2Fm - BW/2$ | −16 |
| $+3/8 \times [-2 - (f_L/Fm - BW/2/Fm)^2/3 + (f_L/Fm + BW/2/Fm) \cdot \{4 - 2(f_L/Fm + BW/2/Fm) + (f_L/Fm + BW/2/Fm)^2/3\}]$ $Fm - BW/2 < f_L < Fm + BW/2$ | −17 |
| $+3/4 \times [4/3 - (f_L/Fm - BW/2/Fm) \cdot \{2 - (f_L/Fm - BW/2/Fm) + 1/6(f_L/Fm - BW/2/Fm)^2\}]\ 2Fm - BW/2 < f_L \leq 2Fm$ | −18 |

Here, the frequency $f_{c1}$ and $f_c$ are normalized by the input third-order intercept point IIP3 to obtain:

$$a_2/a_1 = 1/(3/2 \cdot R \cdot IIP3)$$

$$I_{i1} = V_1^2/2/R/(IIP3)$$

$$I_{i2} = 1/2 \cdot V_2^2/2/R/(IIP3)$$

The dB value of the sum of 1 to 18 in equation (25) is B of equation (16).

(2) Error Rate Characteristic

The error rate characteristic is found using the n-th interference power and interference reduction factor of equation (9), equation (12), or equation (18) from the IRF$_3$ obtained by converting the IRF$_3$ (dB value) expressed by equation (25) to the truth value.

The following action is obtained by the line quality characteristic evaluation system according to the present invention explained in brief above:

It is clear that it is possible to express the correspondence with the BER from the intercept point input level (IIP), reception thermal noico, and plurality of interference leakage powers from adjacent channels as nonlinear characteristics of the interfered reception system using equations (4) to (5) expressing the signal of the desired wave and signals of the plurality of interference waves input for reception of a modulated wave, equations (6) to (9) expressing the QPSK delay detection type simplified error rate characteristic, equations (10) to (13) expressing the QPSK delay detection type error rate characteristic, equations (13) to (19) expressing the QPSK absolute synchronous detection error rate characteristic, or equation (20) expressing the QPSK differential synchronous detection error rate characteristic. Therefore, it is possible to more precisely and flexibly provide line qualities under nonlinear interference due to the IIP3 characteristic, reception thermal noise, and plurality of interference leakage powers from adjacent channels.

R turning to FIG. 1, the reception signal level normalized by IIP3 after the antenna 4 of the interfered digital wireless receiver 3 side of the desired wave is $I_{iD}$, the reception signal level received by the antenna 4 of the interfered digital wireless receiver 3 side from the interfering digital wireless transmitter 5 normalized by IIP3 is $I_{i1}$, and the probabilities of occurrence of the levels are $P(I_{iD})$ and $P(I_{i1})$.

Here, the average bit error rate characteristic of the interfered digital wireless equipment under nonlinear interference becomes as follows:

$$BER = \sum_{I_{iD}} \sum_{I_{i1}} \{ber(I_{iD}, I_{i1}) \times P(I_{iD}) \times P(I_{i1})\} \quad (26)$$

Here, (ber($I_{i0}$, $I_{i1}$)) is the bit error rate calculated by equations (6) to (8), equations (10) to (13), equations (14) to (16), or equation (17).

Second Embodiment

FIG. 6 is a block diagram of the configuration of a line quality characteristic evaluation system according to a second embodiment of the present invention. The point of difference from FIG. 1 is that in the present embodiment, there are a plurality of interfering digital wireless transmitters (in the illustrated example, two, that is, the transmitter 5 and transmitter 8) simultaneously present. Reference numeral 9 is an antenna of the transmitter 8.

The reception signal level normalized by IIP3 after the antenna of the interfered digital wireless receiver 3 side of the desired wave is $I_{i0}$, the reception signal levels received by the antenna 4 of the interfered digital wireless receiver 3 side from the interfering digital wireless transmitters 5 and 7 normalized by IIP3 are $I_{i1}$ and $I_{i2}$, and the probabilities of occurrence of the levels are $P(I_{i0})$, $P(I_{i1})$, and $P(I_{i2})$.

Here, the average bit error rate characteristic of the interfered digital wireless equipment under nonlinear interference becomes as follows:

$$BER = \sum_{I_{iD}} \sum_{I_{i1}} \sum_{I_{i2}} \{ber(I_{iD}, I_{i1}, , I_{i2},)\} \times P(I_{iD}) \times P(I_{i1}) \times P(I_{i2})\} \quad (27)$$

Here, (ber($I_{iD}$, $I_{i1}$)) is the bit error rate calculated by equations (6) to (8), equations (10) to (13), equations (14) to (16), or equation (17).

Further, as the line quality characteristic, in the same way as the first embodiment, the bit error rate characteristic, packet error rate characteristic, etc. may be applied.

Third Embodiment

Figure 7:
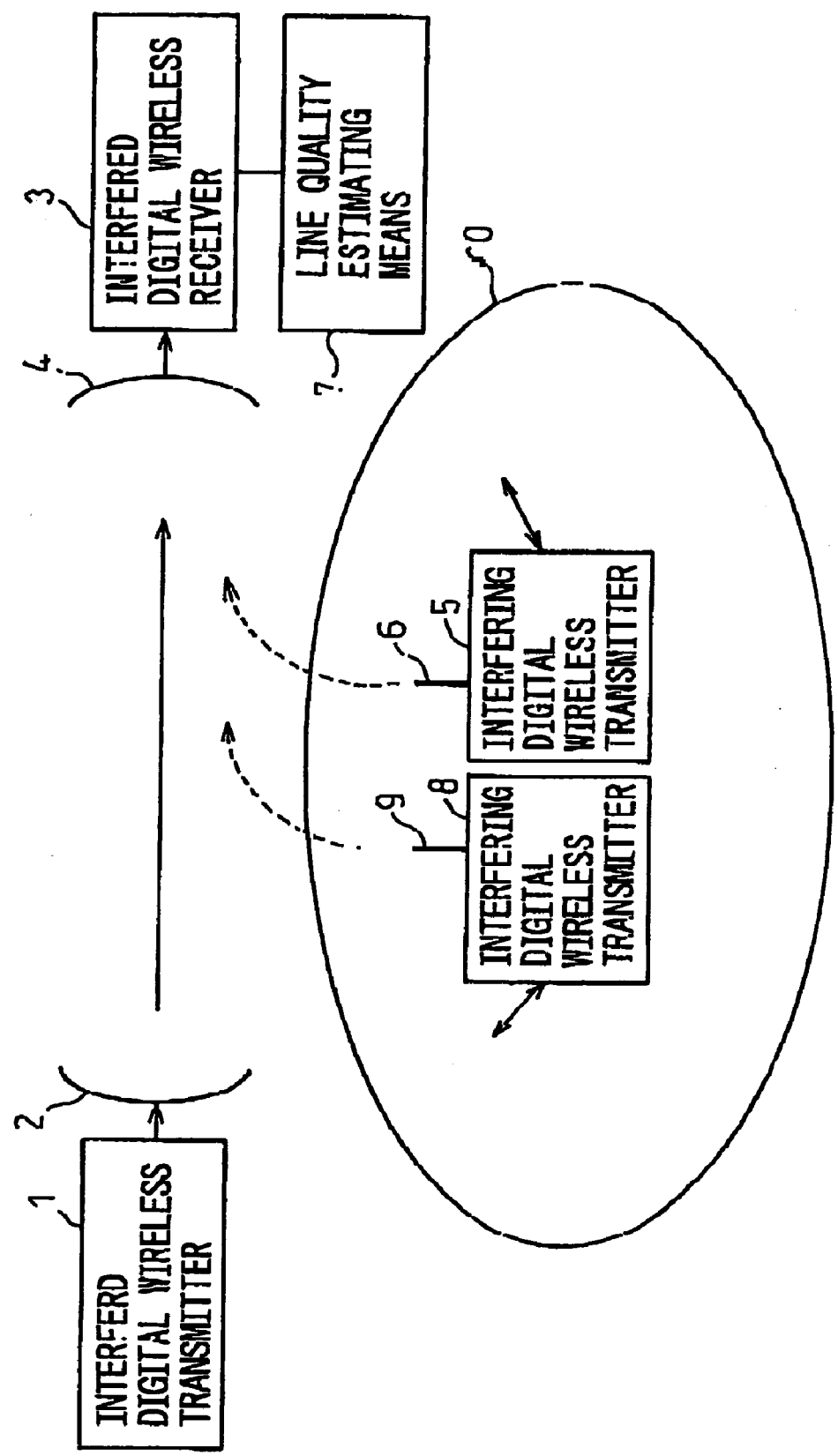
FIG. 7 is a block diagram of the configuration of an interference measuring and evaluating system according to a third embodiment of the present invention.

FIG. 7 is a block diagram of the configuration of an interference measuring and evaluating system according to a third embodiment of the present invention. The difference from FIG. 6 is that in the present embodiment the interfering digital wireless transmitters 5 and 8 move in the service area 10. In this case, the line quality is estimated based on the probability of the interfering digital transmitters 5 and 8 being present at locations indicated by (x,y) coordinates in the service area.

For simplification of the explanation, it is assumed that only the interfering digital wireless transmitter 5 is in the service area 10 and moves in the service area 10. The level of the reception level after the antenna 4 of the interfered digital wireless mobile station 3 of the desired wave normalized by IIP3 is $P_{i0}$, the probability of occurrence of the level $I_{iD}$ is $P(I_{iD})$, the probability of the interfered digital wireless reception side of the interference wave being present at an (x,y) coordinate in the service area is P(x,y), and the level of the reception signal level received at the antenna 4 of the interfered digital wireless receiver 3 side from the interfered digital wireless transmitter 5 normalized by IIP3 is $I_{i1}$.

Here, the average bit error rate characteristic of the interfered digital wireless under nonlinear interference becomes as follows:

$$BER(x, y) = \sum_{I_{iD}} \sum_{x,y} \{ber(I_{iD}, I_{i1},)\} \times P(I_{iD}) \times P(x, y)\} \qquad (28)$$

Here, (ber($I_{iD}$, $I_{i1}$) is the bit error rate calculated by equations (6) to (8), equations (10) to (13), equations (14) to (16), or equation (17).

Further, as the line quality characteristic, in the same way as the above embodiments, the bit error rate characteristic, packet error rate characteristic, etc. may be applied.

Here, if making the area of the service area S and making the area calculated from an x,y coordinate where BER exceeds the prescribed value Q "s"

$$Q \leq \sum_v BER(x, y) \qquad (29)$$

the probability (V) of there being a wireless line present at the location where BER exceeds the prescribed value Q becomes $V = s/S \times 100\%$ When a plurality of interfering digital wireless transmitters move in the service area 10, equation (27) in the second embodiment may be applied for equation (28) and (29).

Fourth Embodiment

Figure 8:
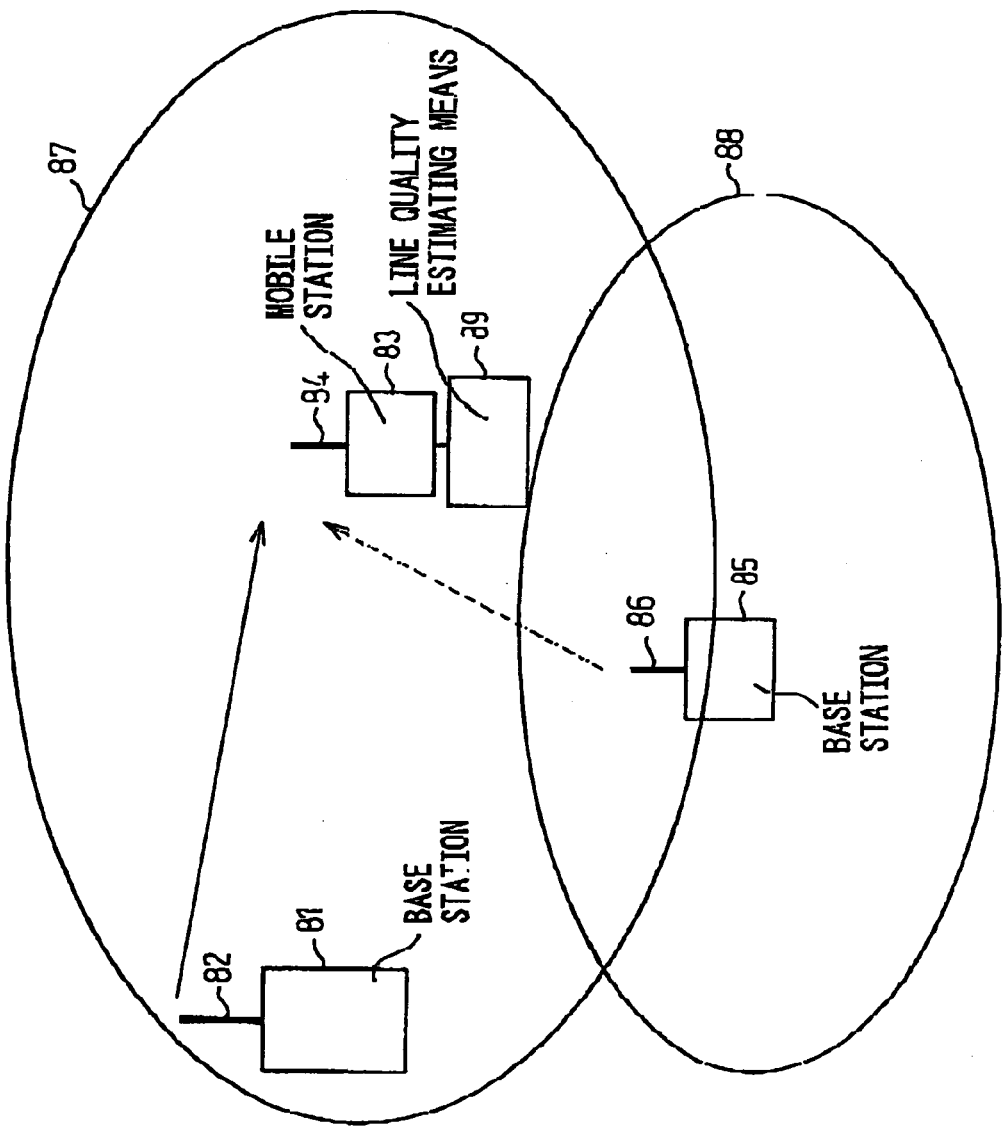
FIG. 8 is a block diagram of the configuration of a line quality characteristic evaluation system according to a fourth embodiment of the present invention.

FIG. 8 is a block diagram of the configuration of a line quality characteristic evaluation system according to a fourth embodiment of the present invention. In the figure, 81 indicates an interfered digital wireless base station (transmission side), 82 an antenna of the interfered digital wireless base station (transmission side) 81, 83 an interfered digital wireless mobile station (reception side), 84 an antenna of an interfered digital wireless mobile station (reception side) 83, 85 an interfering digital wireless mobile station (transmission side), 86 an antenna of the interfering digital wireless mobile station (transmission side) 85, 87 a service area of the digital wireless base station (transmission side) 81, 88 a service area of the digital wireless mobile station (transmission side) 85, and 88 a line quality estimating means.

Here, the solid line shows the desired wave route, while the broken line shows the interference wave route.

In the present embodiment, the line quality estimating means provides base stations and mobile stations for communicating by digital signals in an area where a plurality of wireless lines communicating wirelessly sharing space are present together and, at a downstream mobile wireless line from a base station to a mobile station, estimates a wireless line quality of a range of area under nonlinear interference by a plurality of interference waves for a planar distribution of the mobile stations based a mobile station reception level due to mobile stations uniformly distributed in the area and a multiplexer channel of downstream lines, an interference level received by the mobile station from a wireless line in the area or nearby, and a prescribed value in the area using a line quality characteristic estimating means of a wireless communication line in the above embodiments.

The probability of the mobile station 83 being present at an (x,y) coordinate in the service area 87 of the interfered digital wireless base station 81 of the desired wave is P(x,y), the average level of the reception signal level received at the antenna 84 of the interfered digital wireless mobile station (reception side) 83 at that location normalized by IIP3 is $I_{iD}$, the level of the reception signal level received at the antenna 84 of the interfered digital wireless mobile station (reception side) 83 present at the (x,y) coordinate in the service area from the interfered digital wireless base station 85 normalized by IIP3 is $I_{i1}$, and the probability of occurrence of the level is P(Iii).

Here, the average bit error rate characteristic of the interfered digital wireless equipment under nonlinear interference becomes as follows:

$$BER(x, y) = \sum_{x,y} \sum_{I_{i1}} \{ber(I_{iD}, I_{i1},)\} \times P(x, y) \times P(I_{i1})\} \qquad (30)$$

Here, (ber($I_{i0}$, $I_{i1}$,) is the bit error rate calculated by equations (6) to (8), equations (10) to (13), equations (14) to (16), or equation (17).

Further, as the line quality characteristic, in the same way as the above embodiments, the bit error rate characteristic, packet error rate characteristic, etc. may be applied.

Here, if making the area of the service area S and making the area calculated from an x,y coordinate where BER exceeds the prescribed value Q "s"

$$Q \leq \sum_v BER(x, y) \qquad (31)$$

the probability (V) of there being a wireless line present at the location where BER exceeds the prescribed value Q becomes $V = s/S \times 100\%$ Fifth Embodiment FIG. 9 is a block diagram of the configuration of a line quality characteristic evaluation system according to a fifth embodiment of the present invention. In the figure, 91 indicates an interfered digital wireless base station (reception side), 92 an antenna of the interfered digital wireless base station (recepton side) 91, 93 an interfered digital wireless mobile station (transmission side) 94 an antenna of an interfered digital wireless mobile station (transmission side) 93, 95 an interfering digital wireless mobile station (transmission side), 96 an antenna of the interfering digital wireless mobile station (transmission side) 95, 97 a service area of the digital wireless base station (reception side) 91, and 98 a service area of the digital wireless mobile station (transmission side) 95.

Here, the solid line shows the desired wave route, while the broken line shows the interference wave route.

In the present embodiment, the line quality estimating means estimates a channel capacity in a range of area under nonlinear interference in an upstream mobile wireless line from a mobile station to a base station in mobile wireless communication comprised of base stations and mobile stations communicating by digital signals in an area in which a plurality of wireless lines for wireless communication sharing space are present together, a base station reception level by a multiplexer channel of upstream lines from mobile stations distributed in the area, an interference level received by the base station from a wireless line in the area or nearby, an amount of interference in a same system from a plurality of mobile stations distributed uniformly in the area, a prescribed value in the area obtained from a line quality characteristic estimating means of a wireless communication line according to the first to third embodiments, and the number of the plurality of mobile stations distributed uniformly planarly.

The reception signal level of the modulated carrier wave transmitted by the mobile station 93 in the service area 97 of the interfered digital wirelesss base station (reception side) 91 of the desired wave and received by the antenna 92 of the interfered digital wireless base station (reception side) 91 normalized by IIP3 is $I_{iD}$, the probability of occurrence of that level is $P(I_{iD})$, the levels of the reception signal levels transmitted from the interfering digital wireless mobile stations (transmission side) 95 present at (x,y) coordinates in the service area 97 and received at the antenna 92 of the interfered digital wireless mobile station (reception side) 91 normalized by IIP3 are $I_{i1}, \ldots, I_{in}$, and the probabilities of occurrence of those level are $P(I_{in})$.

Here, the average bit error rate characteristic of an interfered digital wireless equipment under nonlinear interference becomes as follows:

$$BER(x, y) = \sum_{x,y} \sum_{I_{iJ}} \{ber(I_{iD}, I_{iI},)\} \times P(x, y) \times P(I_{iI})\} \quad (32)$$

Here, $(ber(I_{in}, I_{i1})$ is the bit error rate calculated by equations (6) to (8), equations (10) to (13), equations (14) to (16), or equation (17).

Further, as the line quality characteristic, in the same way as the above embodiments, the bit error rate characteristic, packet error rate characteristic, etc. may be applied.

Here, if making the area of the service area S and making the area calculated from an x,y coordinate where BER exceeds the prescribed value Q "s"

$$Q \leq \sum_v BER(x, y) \quad (33)$$

the probability (V) of there being a wireless line present at the location where BER exceeds the prescribed value Q becomes $V=s/S\times100\%$ Summarizing the eff cts of the invention, as clear from the above explanation, according to the present invention, means for estimating theoretical equations and theoretical curves under nonlinear interference establishing correspondence among the reception line quality characteristics from the reception thermal noise characteristic, third-order intermodulation by nonlinear interference, and leakage power of the linear interference and evaluation of the line quality of wireless communication system under nonlinear interference in a service in which wireless lines wirelessly communicating sharing space and other wireless line interfering with the same using the theoretical equations and theoretical curves become possible.

Therefore, in an area where mainly mobile wireless communication systems themselves or a mobile wireless communication system, terrestrial fixed wireless commuinication system, mobile satellite communication system, or other wireless system are present together, at the stage of planning new wireless lines, it becomes possible to accurately evaluate in advance the cases where the nonlinear interference would cause deterioration of the line quality by quantifying the occurrence of nonlinear interference and thereby provide a wireless communication line excellent in line quality and efficient in interfered wireless communication.

The evaluating means is a technique enabling accurate estimation of overall reception performance from the invented nonlinear interference theory or theoretical curves even if the performance of the reception system relating to nonlinear interference and the specifications of the inside of the apparatus of the interfered wireless system are unknown. It is possible to flexibly evaluate this in advance for nonlinear interference assuming an actual environment and provide efficient countermeasures and means for preventing line deterioration due to nonlinear interference.

Further, the occurrence of nonlinear interference occurring due to an increase in wireless communication lines occurring after opening a line can be evaluated in advance as the line quality and measures can be taken against deterioration of the line quality due to the nonlinear interference based on the evaluation.

While the invention has been described with reference to specific embodiments chosen for purpose of illustration, it should be apparent that numerous modifications could be made thereto by those skilled in the art without departing from the basic concept and scope of the invention.

What is claimed is:

1. A line quality characteristic evaluation system for a wireless communication line comprising:
   a line quality estimating means estimating a line quality of the wireless communication line under nonlinear interference wireless lines in an area in which wireless lines for wireless communication by digital signals sharing space and other wireless lines interfering with the wireless lines are present together,
   wherein said estimating the line quality of the wireless communication line is based on nonlinear distortion influenced by all wireless lines in the area and said nonlinear distortion is expressed by an intercept point input level (IIP), and
   wherein said estimating the line quality of the wireless communication line is based further on;
   a reception equivalent band limitation expressed by attenuation of the intercept point input level (IIP),
   reception side thermal noise of the wireless communication lines, and
   said leakage power from other interfering wireless lines leaking into the reception equivalent band.

2. A line quality characteristic evaluation system as set forth in claim 1, wherein there are a plurality of other wireless lines and wherein said line quality estimating means further estimates that line quality of a wireless communication line based on probabilities of existence of an interfering plurality of wireless lines at any positions in said area.

3. A line quality characteristic evaluation system as set forth in claim 1, wherein said line quality estimating means provides base stations and mobile stations communicating by digital signals in said area and, at a downstream mobile wireless line from a base station to a mobile station, estimates a wireless line quality of a range of area under nonlinear interference by a plurality of interference waves for a planar distribution of said mobile stations based on a mobile station reception level due to mobile stations distributed in said area and a multiplexer channel of downstream lines, an interference level received by said mobile station from a wireless line in said area or nearby, and a prescribed value in said area.

4. A line quality characteristic evaluation system as set forth in claim 3, wherein said line quality estimating means estimates a channel capacity in an upstream mobile wireless line from a mobile station to a base station in a range of area under nonlinear interference based on a reception level of a signal by said base station by a multiplexer channel from a plurality of mobile stations distributed in said area, an interference level received by said base station from a wireless line in said area or nearby, an amount of interference in a same system from a plurality of mobile stations distributed in said area, and the number of the plurality of mobile stations distributed planarly.

5. A line quality characteristic evaluation system as set forth in claim 2, wherein said line quality estimating means provides base stations and mobile stations communicating by digital signals in said area and, at a downstream mobile wireless line from a base station to a mobile station, estimates a wireless line quality of a range of area under nonlinear interference by a plurality of interference waves for a planer distribution of said mobile stations based on a mobile station reception level due to mobile stations distributed in said area and a multiplexer channel of downstream lines, an interference level received by said mobile station from a wireless line in said area or nearby, and a prescribed value in said area.

* * * * *

UNITED STATES PATENT AND TRADEMARK OFFICE
CERTIFICATE OF CORRECTION

| | | |
|---|---|---|
| PATENT NO. | : 7,177,599 B2 | Page 1 of 1 |
| APPLICATION NO. | : 10/643078 | |
| DATED | : February 13, 2007 | |
| INVENTOR(S) | : Isao Nakazawa et al. | |

It is certified that error appears in the above-identified patent and that said Letters Patent is hereby corrected as shown below:

Column 18, Line 6, change "planer" to --planar--.

Signed and Sealed this

Twenty-ninth Day of May, 2007

JON W. DUDAS
*Director of the United States Patent and Trademark Office*